(12) United States Patent
Kim

(10) Patent No.: US 7,773,269 B2
(45) Date of Patent: Aug. 10, 2010

(54) SCANNER AND CONTROL METHOD THEREOF

(75) Inventor: Jung-han Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/196,416

(22) Filed: Aug. 22, 2008

(65) Prior Publication Data

US 2009/0097080 A1 Apr. 16, 2009

(30) Foreign Application Priority Data

Oct. 11, 2007 (KR) ...................... 10-2007-0102773

(51) Int. Cl.
*H04N 1/024* (2006.01)
*H04N 1/04* (2006.01)

(52) U.S. Cl. ........................ 358/473; 358/496; 358/406; 358/474; 358/483; 358/408; 358/482; 382/313

(58) Field of Classification Search ................. 358/473, 358/472, 474, 496, 498, 408, 483, 482, 406, 358/504; 382/313, 312; 250/208.1, 239, 250/216; 361/679.4
See application file for complete search history.

(56) References Cited

U.S. PATENT DOCUMENTS

| 6,172,774 B1 * | 1/2001 | Yamashita ................... 358/474 |
| 6,362,902 B1 | 3/2002 | Tuli |
| 6,400,472 B1 * | 6/2002 | Yoshimizu ................... 358/498 |
| 2006/0208082 A1 * | 9/2006 | Lee et al. ..................... 235/454 |

FOREIGN PATENT DOCUMENTS

JP 11-266348 9/1999

* cited by examiner

*Primary Examiner*—Cheukfan Lee
(74) *Attorney, Agent, or Firm*—Staas & Halsey LLP

(57) ABSTRACT

A scanner capable of being folded and unfolded, the scanner including a first unit having a first scanning unit which scans a document; a second unit which is rotatably disposed to the first unit, and having a second scanning unit which moves between a folded position in which the second scanning unit faces the first scanning unit, and an unfolded position in which the second scanning unit is unfolded from the folded position; and a moving unit which moves at least one of the first scanning unit and the second scanning unit in at least one of a focus adjusting direction and a transverse direction according to a transport direction of the document.

18 Claims, 13 Drawing Sheets

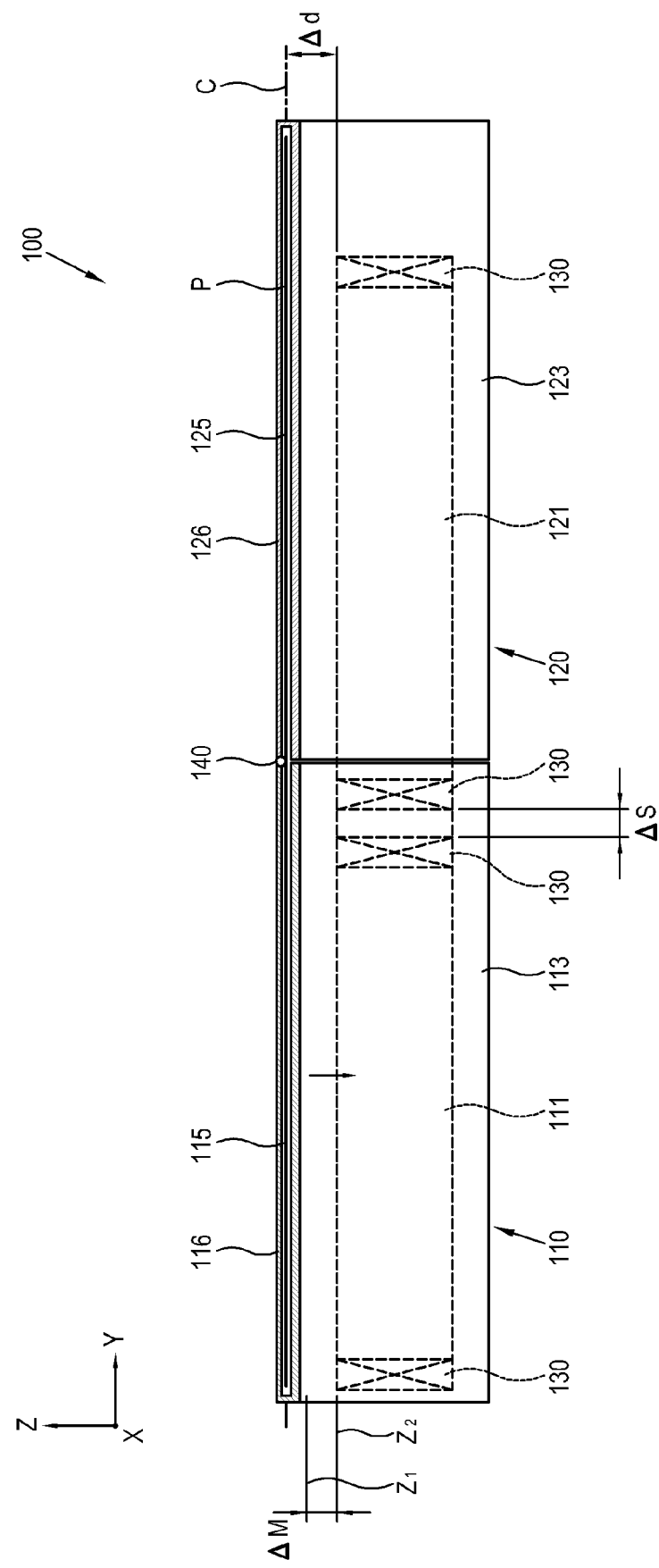

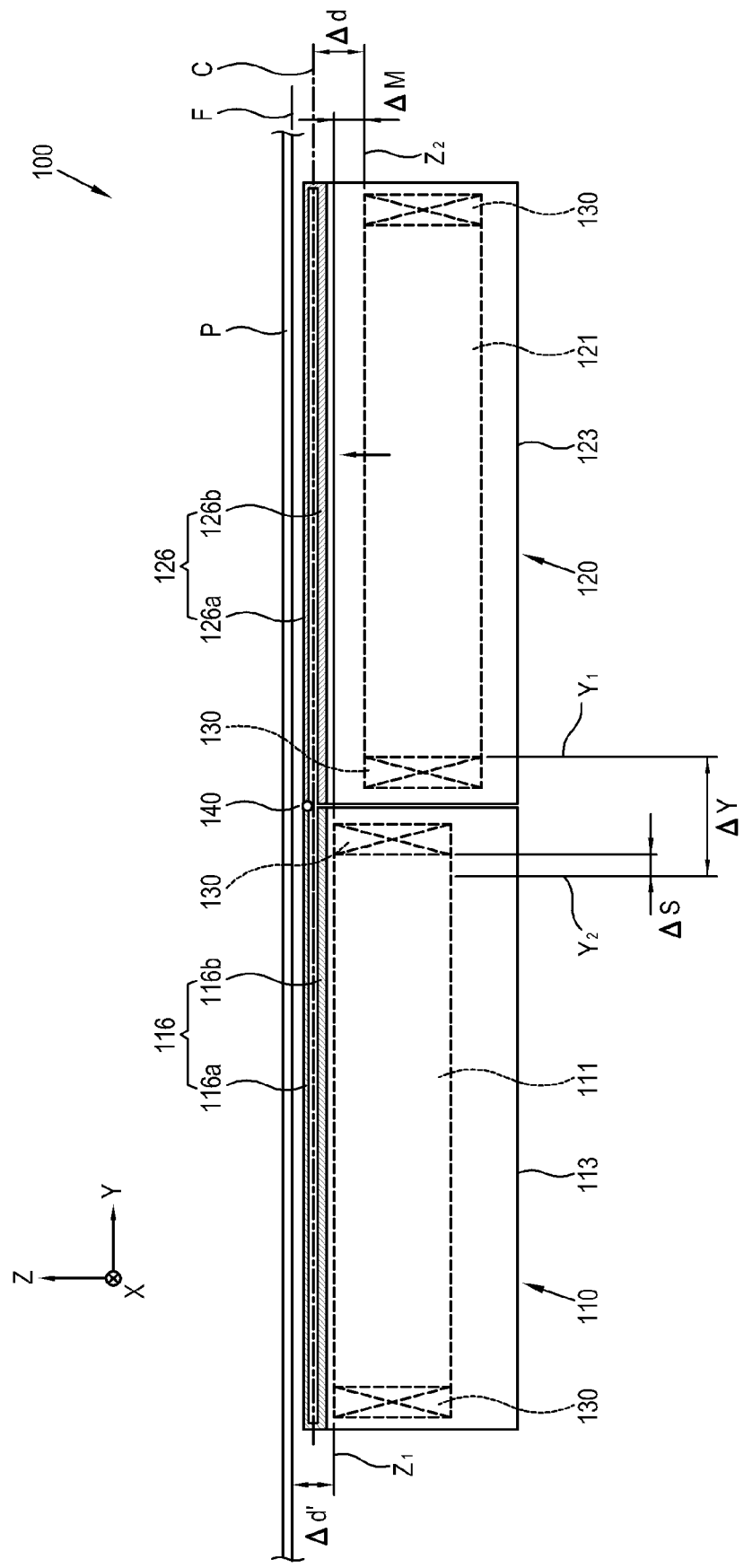

SCANNER AND CONTROL METHOD THEREOF

CROSS-REFERENCE TO RELATED APPLICATION

This application claims the benefit of Korean Application No. 2007-102773, filed Oct. 11, 2007 in the Korean Intellectual Property Office, the disclosure of which is incorporated herein by reference.

BACKGROUND OF THE INVENTION

1. Field of the Invention

An aspect of the present invention relates to a scanner and a control method thereof, and more particularly, to a scanner and a control method thereof scanning both sides of a document in a folded state, and scanning a single side of the document in an unfolded state.

2. Description of the Related Art

A scanner scans an image of a document by illuminating light onto a predetermined location of the document on which image information is formed. The image is then scanned by an illuminating module, and the light reflected from the document is transmitted to an image sensor by an imaging lens, thereby scanning the image information formed at the predetermined position of the document.

Recently, various portable and small scanners have been developed and released. U.S. Pat. No. 6,362,902 discloses a scanner including two scanning units rotatably connected through a hinge unit. Also, Japanese Patent First Publication No. H11-266348 (FOLDABLE HAND SCANNER) discloses a scanner including two scanning units mutually rotating around a hinge.

In U.S. Pat. No. 6,362,902, the two scanning units respectively include first and second scanning sensors, and respectively have slantingly cut shapes. Accordingly, when the two scanning units are unfolded, the first and second scanning sensors are disposed in a line thereby completely scanning a document without a pixel blank. However, when the two scanning units are folded, the length and the depth of focus of the first and second scanning sensors become different, and it is difficult to scan both sides of the document. Accordingly, U.S. Pat. No. 6,362,902, discloses separate scanner embodiments for enabling a double side scanning when folded, and enabling a single side scanning when unfolded Also, productivity is deteriorated because the first and second scanning units are asymmetric, and the slantingly cut surface causes inconvenience to a user carrying the scanner.

Also, the scanner disclosed in Japanese Patent First Publication No. H11-266348 is folded just for carrying, and the double side scanning is impossible when folded.

SUMMARY OF THE INVENTION

Accordingly, it is an aspect of the present invention to provide a scanner and a control method thereof scanning both sides of a small size document when folded, and scanning a larger size document when unfolded.

The foregoing and/or other aspects of the present invention can be achieved by providing a scanner which is capable of being folded and unfolded, the scanner including a first unit which comprises a first scanning unit which scans a document; a second unit which is rotatably disposed to the first unit, and comprises a second scanning unit which moves between a folded position in which the second scanning unit faces the first scanning unit, and an unfolded position in which the second scanning unit is unfolded from the folded position; and a moving unit which moves at least one of the first scanning unit and the second scanning unit in at least one of a focus adjusting direction and a transverse direction to a transport direction of the document.

According to an aspect of the present invention, the first or second scanning units may be provided to move in the focus adjusting direction, and the scanner may further comprise a control unit which controls the moving unit so that focus depth from the first scanning unit to the document, and a focus depth from the second scanning unit to the document can be within a predetermined range.

According to another aspect of the present invention, at least one of the first and second scanning units may be provided to move in the transverse direction, and the scanner further includes a control unit which controls the moving unit so that scanning areas of the first and second scanning units can be overlapped with each other in the transverse direction in the unfolded position.

According to another aspect of the present invention, he first and second units may be respectively formed with first and second document passage openings, and the first and second document passage openings may be connected with each other in the unfolded position so that the document can pass through the first and second scanning units.

According to another aspect of the present invention, the first and second scanning units may be disposed to be focused on the document inside the first document passage opening in the folded position.

According to another aspect of the present invention, the scanner may further comprise a control unit which controls the moving unit so that the first and second scanning units can be moved in the focus adjusting direction to correspond to a document automatic transport mode and a scanner moving mode in which the corresponding position of the document, a single side of which is to be scanned is different if the second unit is positioned in the unfolded position.

According to another aspect of the present invention, the first unit may further comprise a first unit body which is formed with a first passage hole through which the second scanning unit moves in the unfolded position, and the second unit further comprises a second unit body which is formed with a second passage hole which is connected with the first passage hole to guide the document moving in the transverse direction of the second scanning unit.

According to another aspect of the present invention, the scanner may further comprise a cover which opens and closes the first passage hole and the second passage hole.

The foregoing and/or other aspects of the present invention can be achieved by providing a control method of a scanner which comprises a first unit including a first scanning unit which scans a document, and a second unit including a second scanning unit which moves between a folded position in which the second scanning unit faces the first scanning unit, and an unfolded position in which the second scanning unit is unfolded from the folded position, the control method of the scanner including: scanning both sides of the document if the second unit is positioned in the folded position; and moving at least one of the first scanning unit and the second scanning unit in at least one of a focus adjusting direction and a transverse direction to a transport direction of the document if the second scan unit is folded and unfolded.

According to another aspect of the present invention, the control method of the scanner may further comprise transporting the document through a document passage opening which has the same focus depth from the first and second scanning units before scanning both sides.

According to another aspect of the present invention, the moving of the scanning units may further comprise moving at least one of the first and second scanning units in the focus adjusting direction so that a depth of focus from the first scanning unit to the document, and a depth of focus from the second scanning unit to the document can be within a predetermined range.

According to another aspect of the present invention, the control method may further comprise locking the position of the second unit so that the second unit can be positioned in the unfolded position before being moved in the transverse direction.

According to another aspect of the present invention, the first and second units may respectively comprise first and second passage holes which allow at least one of the first and second scanning units to move in the transverse direction in the unfolded position, and the control method of the scanner may further comprise opening the first and second passage holes.

According to another aspect of the present invention, he moving of the scanning units may comprise forwardly moving at least one of the first and second scanning units in the transverse direction so that scanning areas of the first and second scanning units can overlap with each other in the transverse direction after the locking and the opening are performed.

According to another aspect of the present invention, the control method may further comprise: backwardly moving in the transverse direction at least one of the first and second scanning units which is forwardly moved when the second unit is locked and the first and second passage holes are opened, and closing the first and second passage holes after the backwardly move.

According to another aspect of the present invention, the control method may further comprise releasing the locking of the second unit after the backwardly move.

The foregoing and/or other aspects of the present invention can be achieved by providing a scanner which is capable of being folded and unfolded, the scanner including a first unit which comprises a first scanning unit which scans a document; and a second unit which is rotatably disposed to the first unit, and comprises a second scanning unit which moves between a folded position in which the second scanning unit faces the first scanning unit, and an unfolded position in which the second scanning unit is unfolded from the folded position, the first scanning unit distanced from the second scanning unit in a transport direction of the document to prevent a rear surface image from being scanned in scanning in the folded position.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, in which:

FIG. 3D is a plane view of the scanner in FIG. 1 when the first and second scanning units completely move;

FIGS. 6A and 6B are plane views of the scanner in FIG. 1 before and after the second scanning unit forwardly moves in the scanner moving scanning mode;

DETAILED DESCRIPTION OF THE EMBODIMENTS

Figure 1:
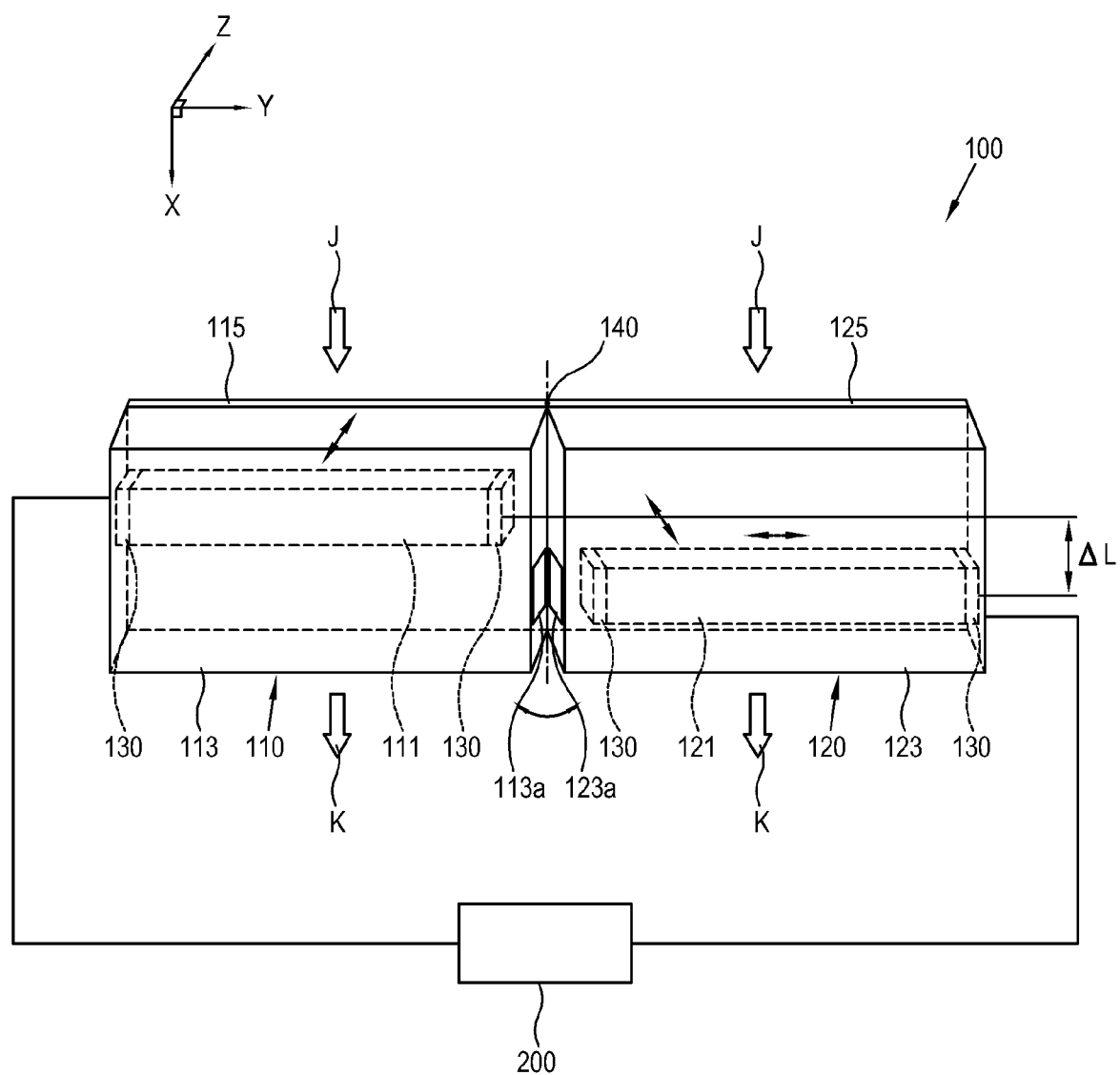
FIG. 1 is a front perspective view of a scanner according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
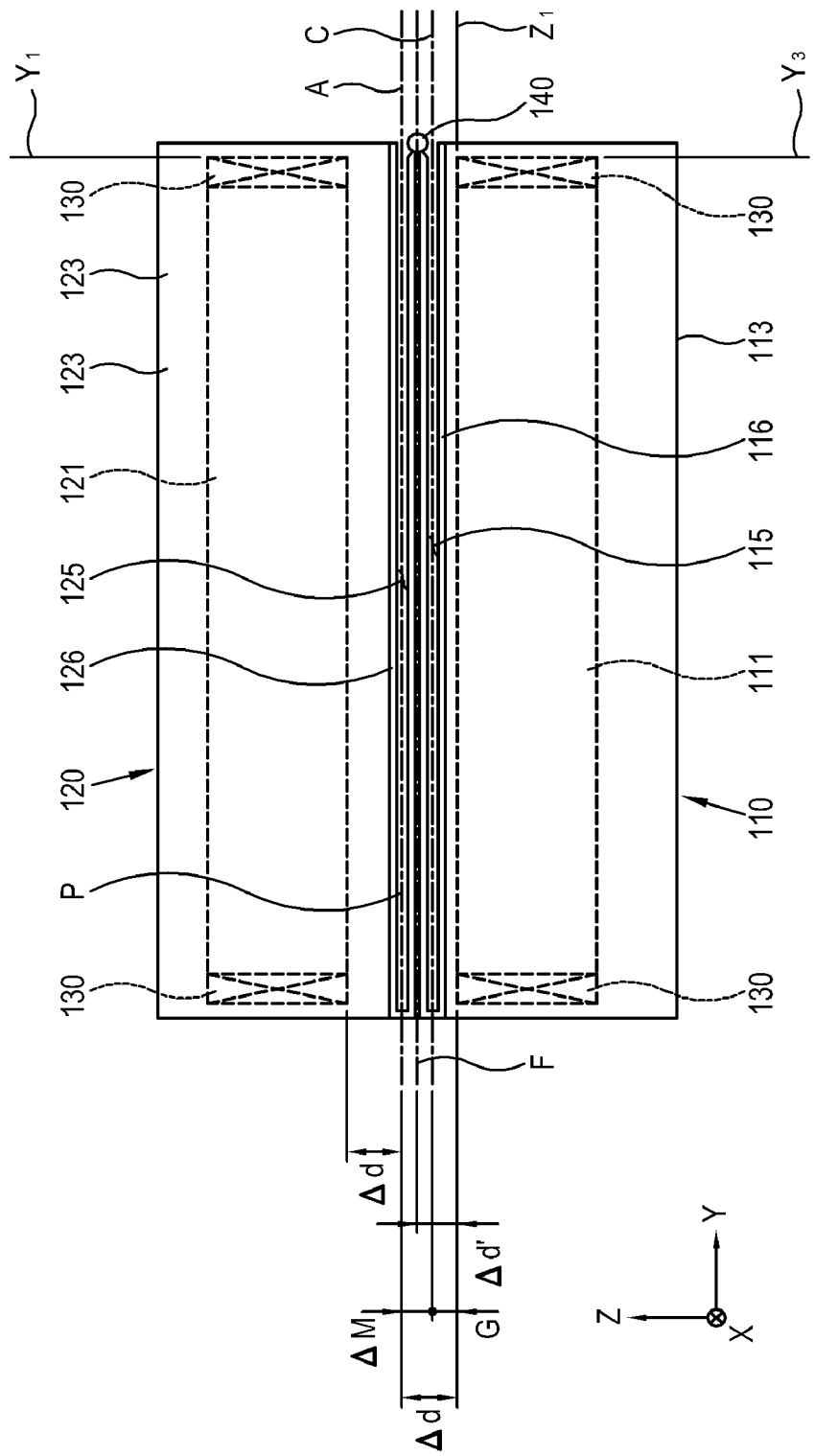
FIG. 2A is a plane view of the scanner in FIG. 1 in a folded state.

As shown in FIGS. 1 and 2A, a scanner 100 according to an exemplary embodiment of the present invention includes a first unit 110, a second unit 120 and a moving unit 130. For a convenient description, a transport direction of a document refers to X, a transverse direction to the transport direction of the document (a main scanning direction) refers to Y, and a perpendicular direction to a surface of the document refers to a focus adjusting direction or Z.

The first unit 110 includes a first unit body 113, and a first scanning unit 111 accommodated inside the first unit body 113 to scan the document. The shown first unit body 113 includes a first document input unit 116 formed with a first document passage opening 115 so that the document can be transported via the first scanning unit 111. The shown first document passage opening 115 is formed in the document transport direction X so that the document can be input in a direction J, and discharged in a direction K. Also, the first document input unit 116 is formed of a transparent material so that light emitted from a light source 111a of the first scanning unit 111 can transmit in an unfolded position. However, it is understood that the opening 115 can be otherwise formed and in other directions.

Figure 2B:
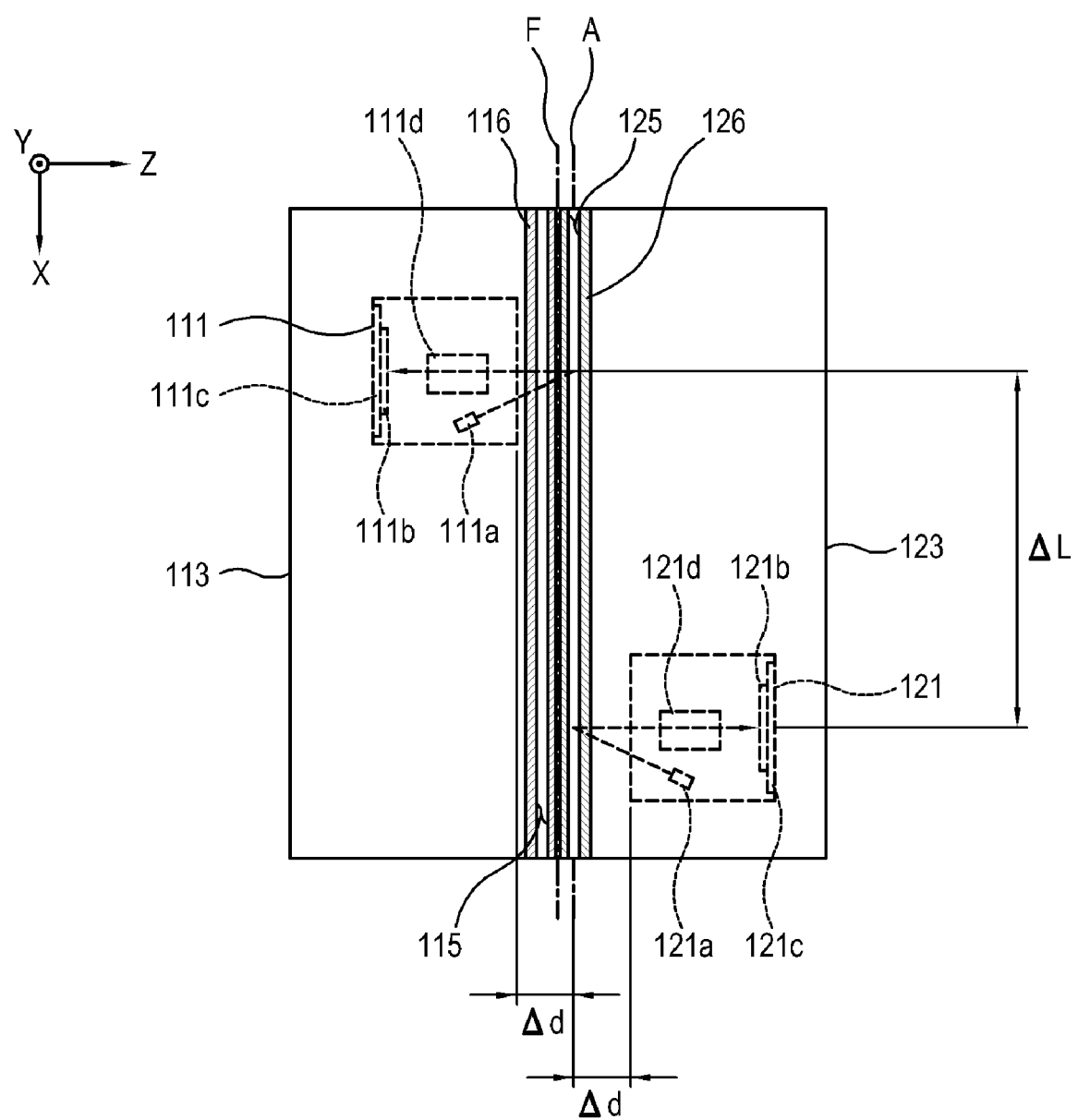
FIG. 2B is a cross sectional view of the scanner in FIG. 1 in the folded state.

As shown in FIG. 2B, the first scanning unit 111 includes the light source 111a emitting the light toward the document, a lens 111d imaging a light reflected by the document to a first scanning sensor 111b, the first scanning sensor 111b converting the reflected-light into an electric image signal, and a printed substrate 111c on which the first scanning sensor 111b is mounted. While not limited thereto, the first scanning sensor 111b may include a contact image sensor (CIS), and the first scanning unit 111 may include a CIS module including the first scanning sensor 111b which includes the CIS. Recently, the CIS module is widely employed in a scanner, a digital camera, etc., because of its low power consumption, and small size.

The first scanning unit 111 may include a charge coupled device (CCD) module employing a CCD sensor instead of the CIS module. Alternatively, the first scanning unit 111 may include other configurations as long as to scan image information of the document.

Figure 3A:
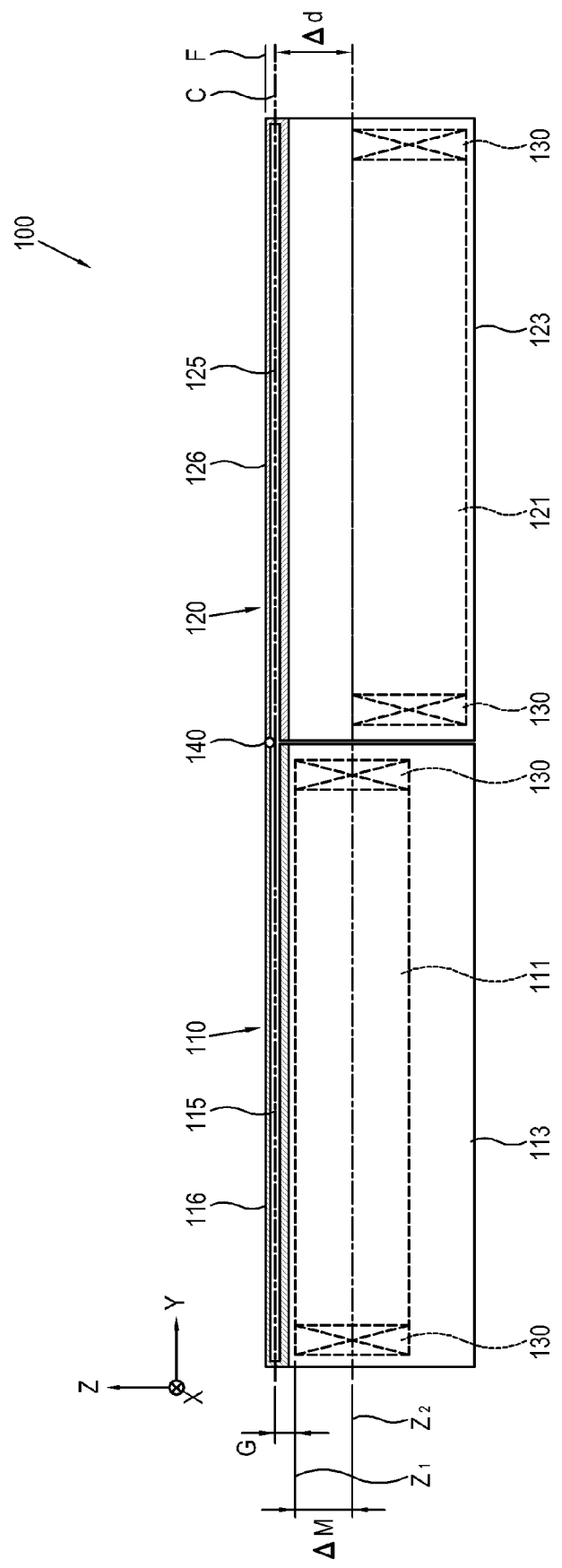
FIG. 3A is a plane view of the scanner in FIG. 1 in an unfolded state before a first scanning unit moves in a focus adjusting direction.

The second unit 120 includes a second unit body 123, and a second scanning unit 121 accommodated inside the second unit body 123 to scan the document. The second unit 120 is rotatably disposed about a hinge 140 with respect to the first unit 110 to move between a folded position and the unfolded position. In more detail, the first scanning unit 111 and the second scanning unit 121 face each other in the folded position as shown in FIG. 2A. The first scanning unit 111 and the second scanning unit 121 are disposed in a line in the main scanning direction Y which is a transverse direction to the document transport direction to scan a single side of the document as shown in FIG. 3A.

The second unit 120 may be manually folded and unfolded by a user, or automatically folded and unfolded if there is a demand of the user as necessary.

As shown in FIG. 2B, the second scanning unit 121 includes a light source 121a emitting light toward the document, a lens 121d imaging a light reflected by the document to a second scanning sensor 121b, the second scanning sensor 121b converting the reflected-light into an electric image signal, and a printed substrate 121c on which the second scanning sensor 121b is mounted. The second scanning sensor 121b may include a contact image sensor (CIS) module.

The first scanning unit 111 and the second scanning unit 121 may have the same shapes and inner configurations to reduce cost. That is, the same two CIS modules are respectively disposed at different positions.

While not required in all aspects, as shown in FIGS. 2A and 2B, the first scanning unit 111 and the second scanning unit 121 are disposed to be focused on the document passing through a second document passage opening 125 in the folded position. That is, the first scanning unit 111 and the second scanning unit 121 may be disposed so that a depth of focus (DOF) Δd from the first scanning unit 111 to a central line A of the second document passage opening 125, and a depth of focus Δd from the second scanning unit 121 to a central line A of the second document passage opening 125 can be the same. Since density of a scanned image, etc. vary, or a scan information may be completely changed depending on the depth of focus Δd, the depth of foci from the first and second scanning units 111 and 121 are the same so that scanned images of the both sides of the document can have a substantially uniform quality.

Since the first scanning unit 111 is distanced from the second document passage opening 125 by Δd which is the depth of focus between the second scanning unit 121 and the second document passage opening 125, the depth of focus from the first document passage opening 115 is reduced by ΔM which is an interval between the first document passage opening 115 and the second document passage opening 125. That is, the depth of focus G between the first scanning unit 111 and the first document passage opening 115 satisfies the following equation, G=Δd−ΔM. Accordingly, the first scanning unit 111 can retreat in the focus adjusting direction Z to be distanced from the first document passage opening 115 by ΔM so that the first scanning unit 111 can scan the document advancing through the first document passage opening 115 in the folded position.

Alternatively, the first scanning unit 111 and the second scanning unit 121 may be disposed to be focused on the document passing through the first document passage opening 115 in the folded position as necessary. Here, a double side scanning of the document is possible when the document is inputted through the first document passage opening 115 instead of the second document passage opening 125. Since the double side scanning of the document is possible when the document is inputted through a specific passage opening between the first and second passage openings 115 and 125, a user may be informed of these contents through a manual. Alternatively, the scanner 100 may include a display panel (not shown), and the user may be informed by the display panel that the document should be inputted through the specific passage opening if the second scan unit 120 is positioned in the folded position.

As shown in FIG. 2B, the first scanning unit 111 and the second scanning unit 121 may be distanced from each other by a predetermined interval ΔL in the document transport direction X. Since each light source 111a and 121a is provided to each scanning unit 111 and 121, and an unwanted image information of the opposite side of the document is apt to be mixed and scanned if lights are concurrently emitted from both directions, the first scanning unit 111 and the second scanning unit 121 may be distanced from each other by the predetermined interval ΔL to be prevented from interfering with each other.

As shown in FIG. 1, the second unit body 123 accommodates the second scanning unit 121, and includes a second document input unit 126 formed with the second document passage opening 125. The second document passage opening 125 allows an inputted document to pass through the second scanning unit 121. The second document passage opening 125 may be provided as a slit formed in the document transport direction X. Here, the second document input unit 126 is formed of a transparent material which can transmit light.

Also, as shown in FIG. 3D, the first and second document input units 116 and 126 are formed to be connected with each other in the folded position. That is, as shown in FIG. 2A, sides of the first and second document input units 116 and 126 toward the hinge 140 are open. Accordingly, the first and second units 110 and 120 are disposed in a line in the transverse direction Y to the document transport direction so that a document larger d than the document which is capable of being scanned in the folded position can be scanned. For example, if the first and second document passage openings 115 and 125 respectively have such a length as to input A6 paper (105 mm×148 mm), A4 paper (210 mm×297 mm) can be inputted through the first and second document passage openings 115 and 125 when the second unit 120 is unfolded.

As shown in FIG. 1, the moving unit 130 is disposed in the first scanning unit 111 and moves in the focus adjusting direction Z. Also, the moving unit 130 may be accommodated in the first unit body 113.

The moving unit 130 may include a coil (not shown) winding around the printed substrate 111c of the first scanning unit 111, and a permanent magnet (not shown) generating an electromagnetic force together with the coil. By switching the direction of a current flowing through the coil, the first scanning unit 111 moves in the focus adjusting direction Z by the electromagnetic force. Alternatively, the moving unit 130 may include a belt (not shown) moving forwardly and backwardly in the focus adjusting direction Z, and an electric driving motor (not shown) driving the belt. The first scanning unit 111 may be supported and moved by a belt. Alternatively, the moving unit 130 may have various other configurations as long as it moves the first scanning unit 111.

Also, the moving unit 130 may move the second scanning unit 121 in at least one of the focus adjusting direction Z and the main scanning direction Y. As described above, the moving unit 130 may be provided to drive the second scanning unit 121 by the electromagnetic force, and may drive the second scanning unit 121 by using the electric driving motor.

While not required in all aspects, the scanner 100 according to the present exemplary embodiment may further include a control unit 200 controlling the moving unit 130 to move the first and second scanning units 111 and 121 in at least one of the focus adjusting direction Z and the main scanning direction Y to correspond to the folded position and the unfolded position. The control unit 200 can be a processor encoded with software or instructions to coordinate the scanning units 111, 121 with the moving unit 130, and to output a scanned image to an internal memory and/or to an external device.

The scanner 100 according to the present exemplary embodiment may further include a document automatic transporting unit (not shown) automatically transporting the document inputted through the first and second document passage openings 115 and 125 in the document transport direction X. The document automatic transporting unit may employ a transport type using a roller or a belt to move the document in the direction J. The document automatic transporting unit may employ other known configurations.

FIG. 3A is a plane view of the scanner 100. As shown therein, the second unit 120 rotates about the hinge 140 to be positioned from the folded position shown in FIG. 2A to the unfolded position. As shown in FIG. 3A, a document bigger than the document scanned in the folded position can be scanned through an opening connecting opening passages 115 and 125. That is, a document approximately twice as big as the document scanned in the folded position can be scanned.

The control unit 200 determines whether the second unit 120 has moved from the folded position to the unfolded position, and controls the moving unit 130 to backwardly move the first scanning unit 111 by ΔM in the focus adjusting direction Z so that the depth of focus G can be Δd if the second unit 120 has moved to the unfolded position. Accordingly, as shown in FIGS. 3A and 3D, the first scanning unit 111 moves from a first focusing position $Z_1$ to a second focusing position $Z_2$.

Here, the first focusing position $Z_1$ is a position in which the depth of focus is set so that the second unit 120 can be disposed to the folded position, and the first and second scanning units 111 and 121 can face each other, thereby scanning both sides of the document. Also, the second focus position $Z_2$ is a position in which the distance from the first scanning unit 111 to a document input position C at which the document is inputted through the first and second document passage openings 115 and 125 becomes Δd if the second unit 120 is disposed in the unfolded position so that the first and second scanning units 111 and 121 can be disposed in a line in the main scanning direction Y.

Figure 3B:
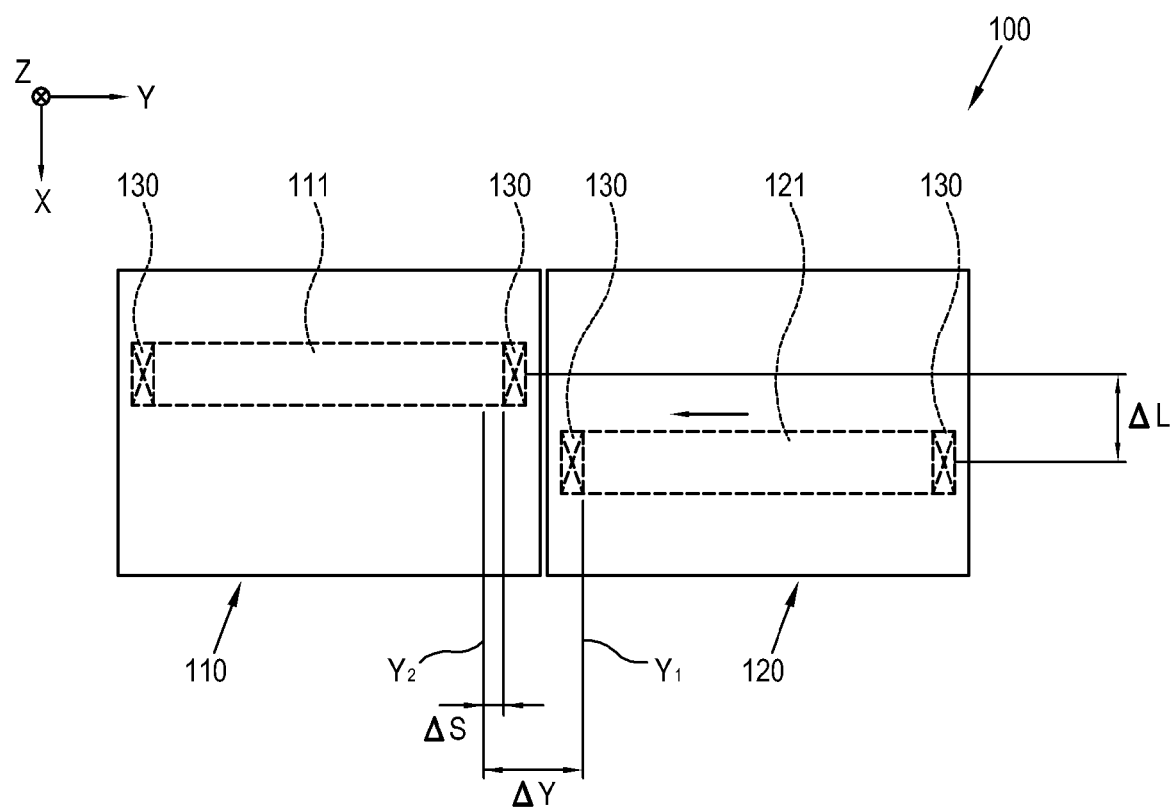
FIGS. 3B and 3C are miniaturized plane views of the scanner in FIG. 3A before and after a second scanning unit moves in a main scanning direction.
Figure 3C:
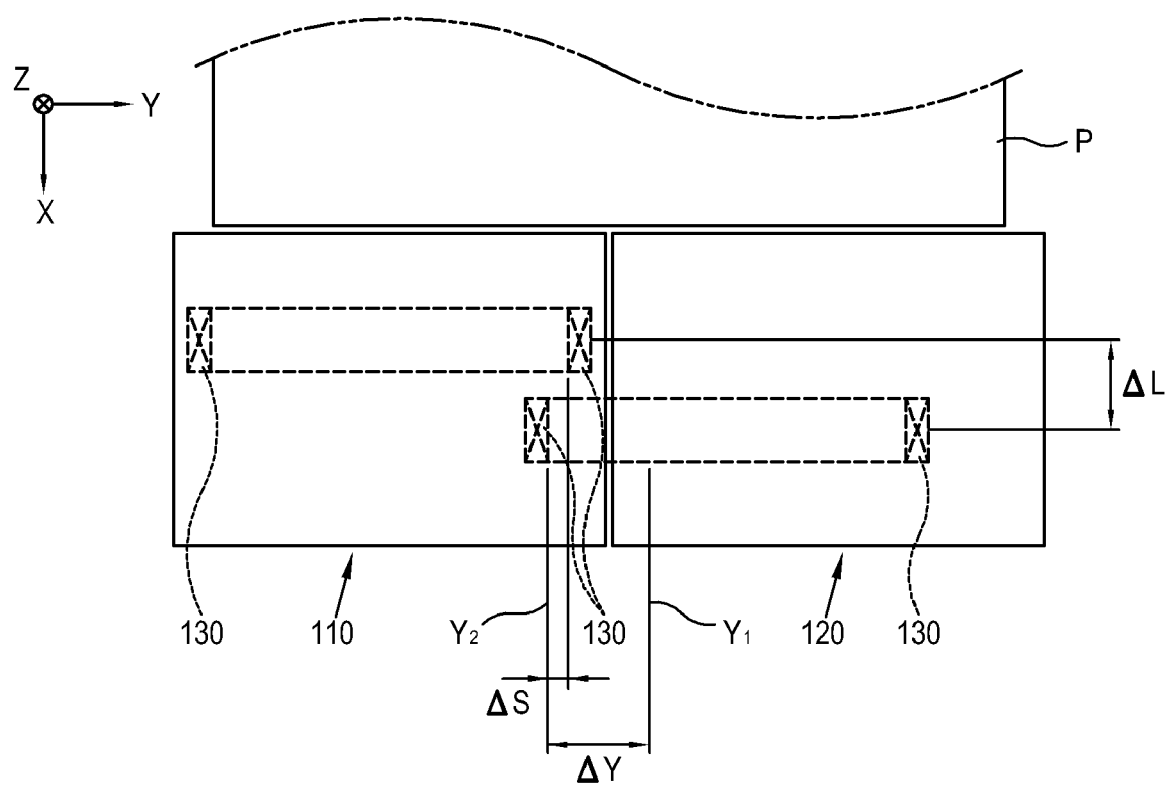
Figure 4:
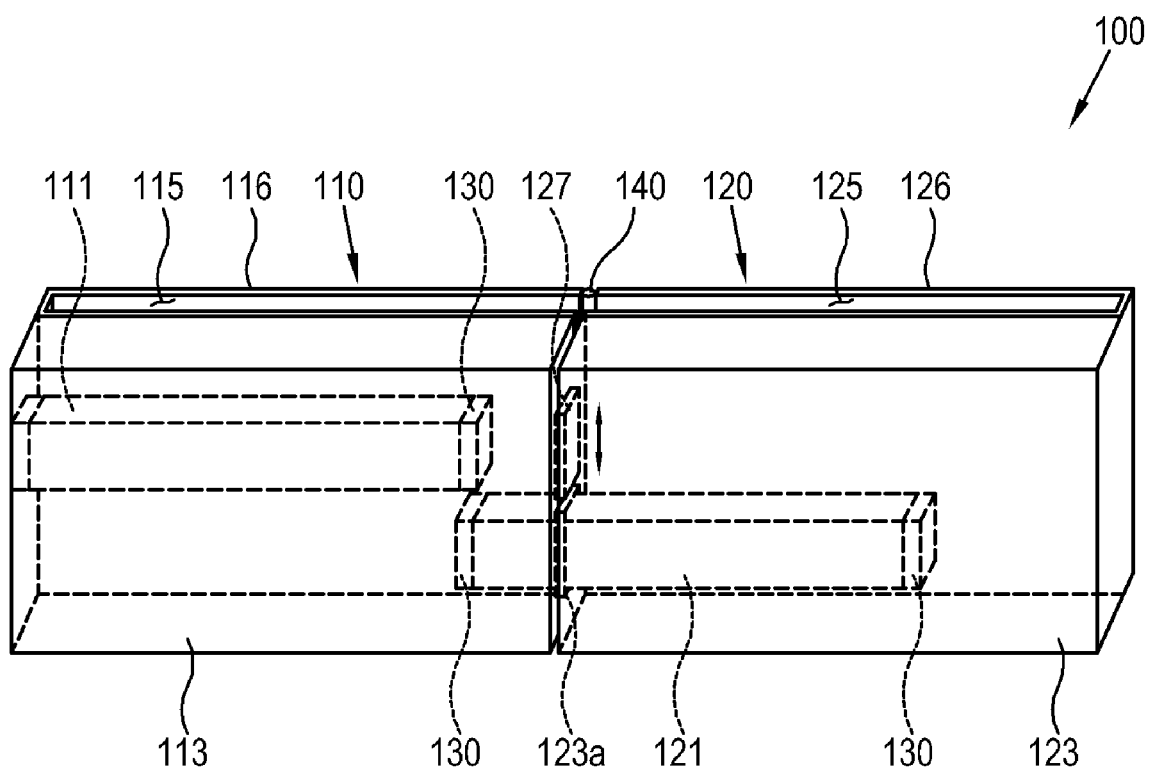
FIG. 4 is a front perspective view of the scanner in FIG. 1 when the first and second scanning units completely move.

FIG. 3B is a plane view of the scanner 100 before a change in the position of the second scanning unit 121, and FIG. 3C is a plane view of the scanner 100 in a position where the second scanning unit 121 is moved to a second scanning position $Y_2$ by the moving unit 130. FIG. 4 is a plane perspective view of the scanner 100 in the state that the second scanning unit 121 moves to the second scanning position $Y_2$.

Also, the control unit 200 controls the moving unit 130 to move the second scanning unit 121 from a first scanning position $Y_1$ distanced by ΔY in the main scanning direction Y when in the folded position to the second scanning position $Y_2$ if the second unit 120 is disposed to the unfolded position.

As illustrated in FIG. 3C, the first scanning position $Y_1$ is a position in the main scanning direction Y in which the second unit 120 faces the first scanning unit 111 to enable the double side scanning in the folded position. Also, the second scanning position $Y_2$ is a position in the main scanning direction Y in which the first and second scanning units 111 and 121 overlap each other by a predetermined effective pixel overlap interval ΔS. Accordingly, the first and second scanning units 111 and 121 can scan the document P in the main scanning direction Y without a blank if the second unit 120 is disposed to the unfolded position. That is, the document P inputted through the first and second document passage openings 115 and 125 can be scanned in a perfect line in the main scanning direction Y. Moreover, since the first and second scanning units 111 and 121 are distanced from each other by ΔL in the document transport direction X, the scanning in the perfect line can be obtained by correcting the position of each scanning unit 111 and 121 by ΔL.

Due to a limit of the rotation configuration of the first and second units 110 and 120 having a symmetric shape to interpose the hinge 140 therebetween, there may be a minute scanning blank area which is incapable of being scanned by each of the scanning units 111 and 121. The scanning blank area can be prevented by moving the second scanning unit 121 in the main scanning direction Y as shown in FIGS. 3B and 3C.

Also, as shown in FIG. 4 and FIG. 1, the first and second units 110 and 120 include a first passage hole (113a) and a second passage hole (123a). Accordingly, the second scanning unit 121 can pass through the first and second unit bodies 113 and 123 in the main scanning direction Y to move from the first scanning position $Y_1$ to the second scanning position $Y_2$.

Also, while not required in all aspects, the first and second units 110 and 120 are respectively provided with a cover 127 opening and closing the first and second passage holes 123a to prevent a foreign substance from entering the first and second unit bodies 113 and 123 through the first passage hole and the second passage hole 123a.

The cover 127 may be linked with the first and second units 110, 120 so as to open when the second unit 120 rotate from the folded position to the unfolded position, and may close to allow the second unit 120 to rotate from the unfolded position to the folded position. Alternatively, the cover 127 may be positioned to close the second passage hole 123a using a spring, and may contact the second scanning unit 121 to open the second passage hole 123a if the second scanning unit 121 moves in the main scanning direction Y. Alternatively, various known configurations may be applied to the opening and closing of the cover 127.

The scanner 100 may further include a locking unit (not shown) locking the position of the second unit 120 in the folded position and the unfolded position. Especially, if a user rotates the second unit 120 to the folded position by mistake when the second scanning unit 121 is positioned in the second scanning position $Y_2$, the second scanning unit 121 may be damaged. The locking unit could lock the second unit 120 in the unfolded position to prevent the second scanning unit 121 from being damaged due to carelessness of the user.

FIGS. 3B, 3C and 3D illustrate a document automatic transport single side scanning mode in which the document is inputted through the first and second document passage openings 115 and 125 connected with each other, and passes through the first and second scanning units 111 and 121 through the document automatic transport unit.

Hereinafter, a scanner moving in a single scanning mode in which the document is stationary, and the scanner 100 is moved in a direction N to perform the scanning will be described by referring to FIGS. 5 to 6B. FIG. 6A is a plane view of the scanner 100 in the state that the second unit 120 is moved to the folded position.

Figure 5:
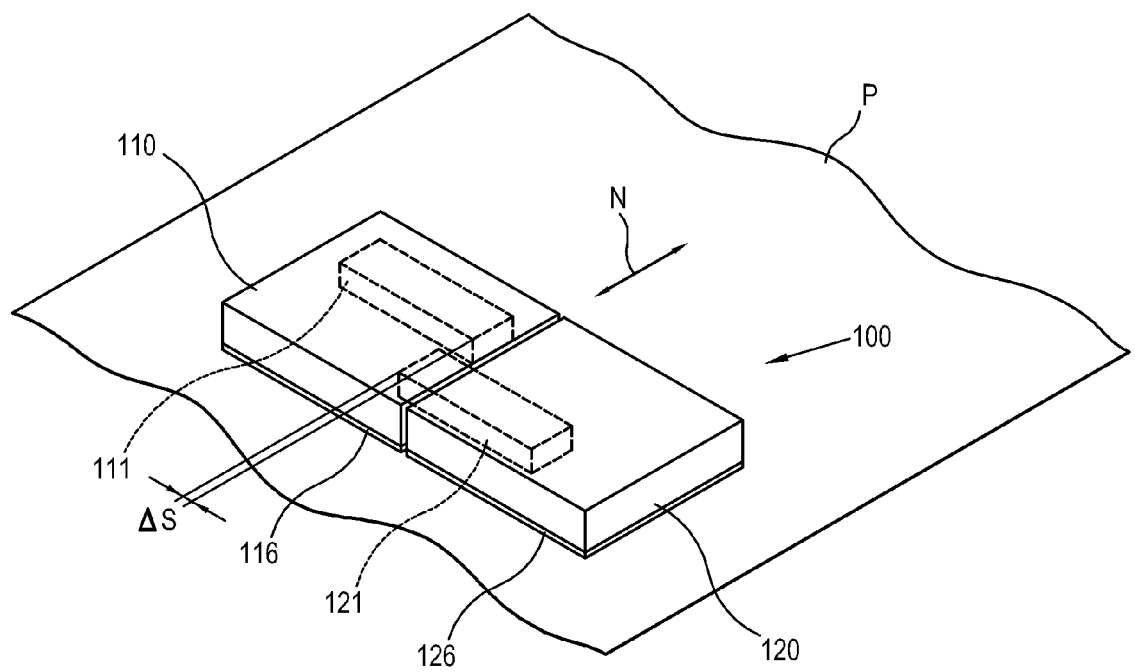
FIG. 5 is a schematic perspective view illustrating a scanning type under a scanner moving scanning mode.
Figure 6B:
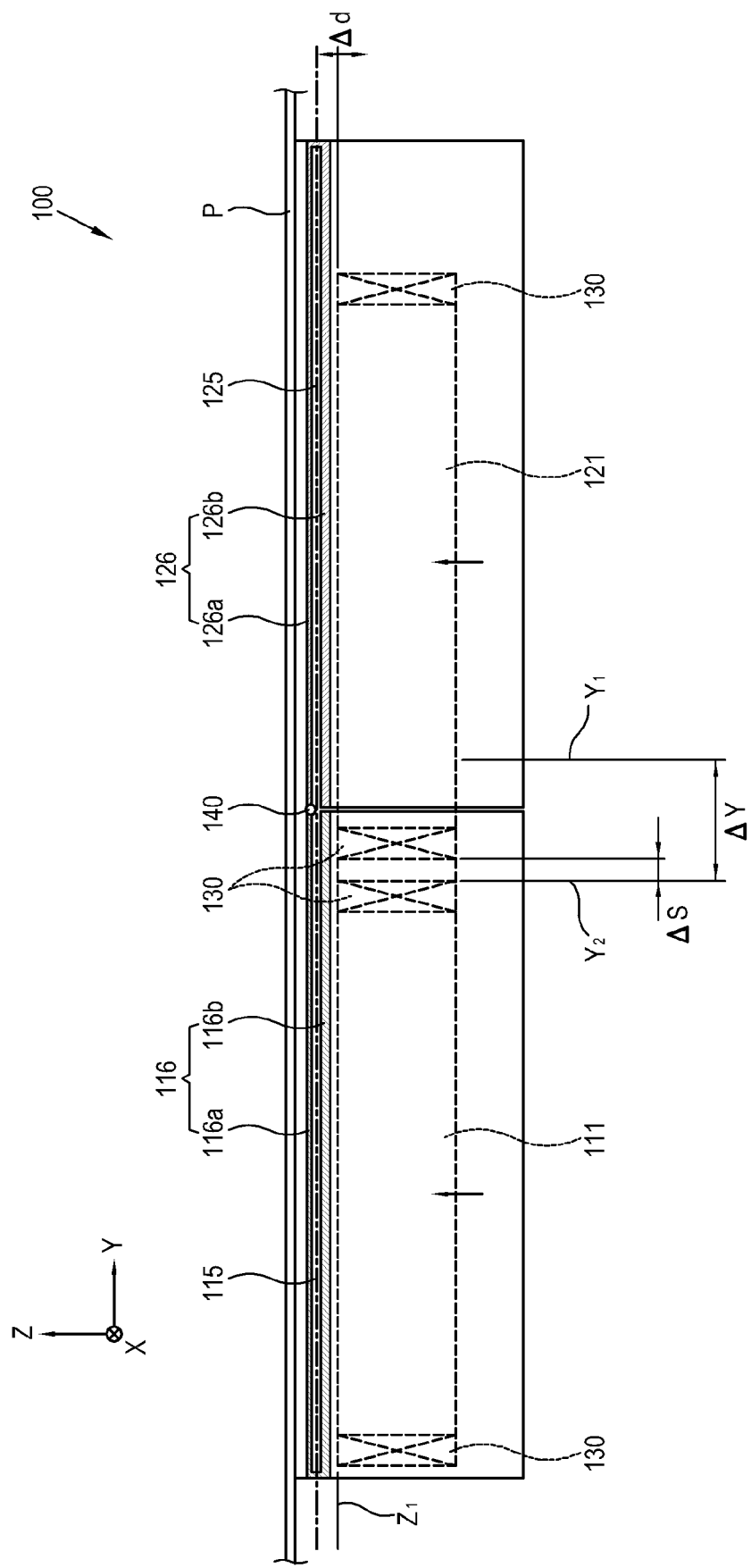

As shown in FIGS. 5 and 6A, if the scanner 100 is put on the document P, and moved to scan the document P, a depth of focus in the focus adjusting direction Z from the document P to the first scanning unit 111 becomes Δd'. That is, when the scanner moves in a single side scanning mode, the difference of the depth of focus is determined by the thickness of the outer circumferences 116*a* and 126*a* of the first and second document input units 116 and 126 in contrast to the document automatic transport single side scanning mode in which the document is inputted through the first and second document passage openings 115 and 125. Accordingly, the moving unit 130 may be controlled to move the first and second scanning units 111 and 121 in the focus adjusting direction Z, thereby correcting the difference of the depth of focus. Accordingly, the depth of focus from the document P can be corrected from Δd' to Δd.

Here, the thickness of the first and second document input units 116 and 126 (that is, the thickness of inner circumferences 116*b* and 126*b* and the outer circumferences 116*a* and 126*a*) is reduced so that Δd' can be within the depth of focus allowing the scanning units 111 and 121 to scan. That is, Δd' can be substantially the same as Δd. Therefore, if the Δd' is within the depth of focus of the first scanning units 111, since scanning is available when the first scanning unit 111 is positioned in the first focus position $Z_1$, it is unnecessary to move the first scanning unit 111 to another position. That is, if only the second scanning unit 121 is forwardly moved from the second focus position $Z_2$ in FIG. 6A to the first focus position $Z_1$ in FIG. 6B, the document P positioned outside the first and second document input units 116 and 126 can be scanned.

If the second unit 120 is disposed in the unfolded position, such as in the document automatic transport single side scanning mode, the second scanning unit 121 is moved in the main scanning direction Y by ΔY so that the scanning areas of the first and second scanning units 111 and 121 overlap each other in the main scanning direction Y by a predetermined overlapping distance ΔS.

For example, the position of each of the scanning units 111 and 121 in a double sided scanning mode in which the second unit 120 is disposed in the folded position to scan both sides of the document, the document automatic transport single side scanning mode, and the scanner moving single side scanning mode may be determined as shown in the following table.

Here, as described above, $Z_1$ and $Z_2$ are the first focus position and the second focus position, respectively, and $Y_1$ and $Y_2$ are the first scanning position and the second scanning position. $Y_3$ in FIG. 2A is a position in the main scanning direction Y of the first scanning unit 111 facing the second scanning unit 121 positioned in the position $Y_1$. The following Table 1 is an example, and the positions of the first and second scanning units 111 and 121 may be variously changed.

The control unit 200 controls the moving unit 130 so that each scanning unit 111 and 121 can move to the positions according to the above table 1 when the second unit 120 is folded and unfolded.

Hereinafter, a control method of the scanner 100 according to the exemplary embodiment of the present invention will be described by referring to FIGS. 3A to 3C, 7 and 8. It is assumed that the first and second units 110 and 120 are capable of scanning only if the second scanning unit 121 moves without movement of the first scanning unit 111 in the scanner moving single side scanning mode. As describe above, this is possible if Δd' is determined to be substantially the same as Δd.

Figure 7:
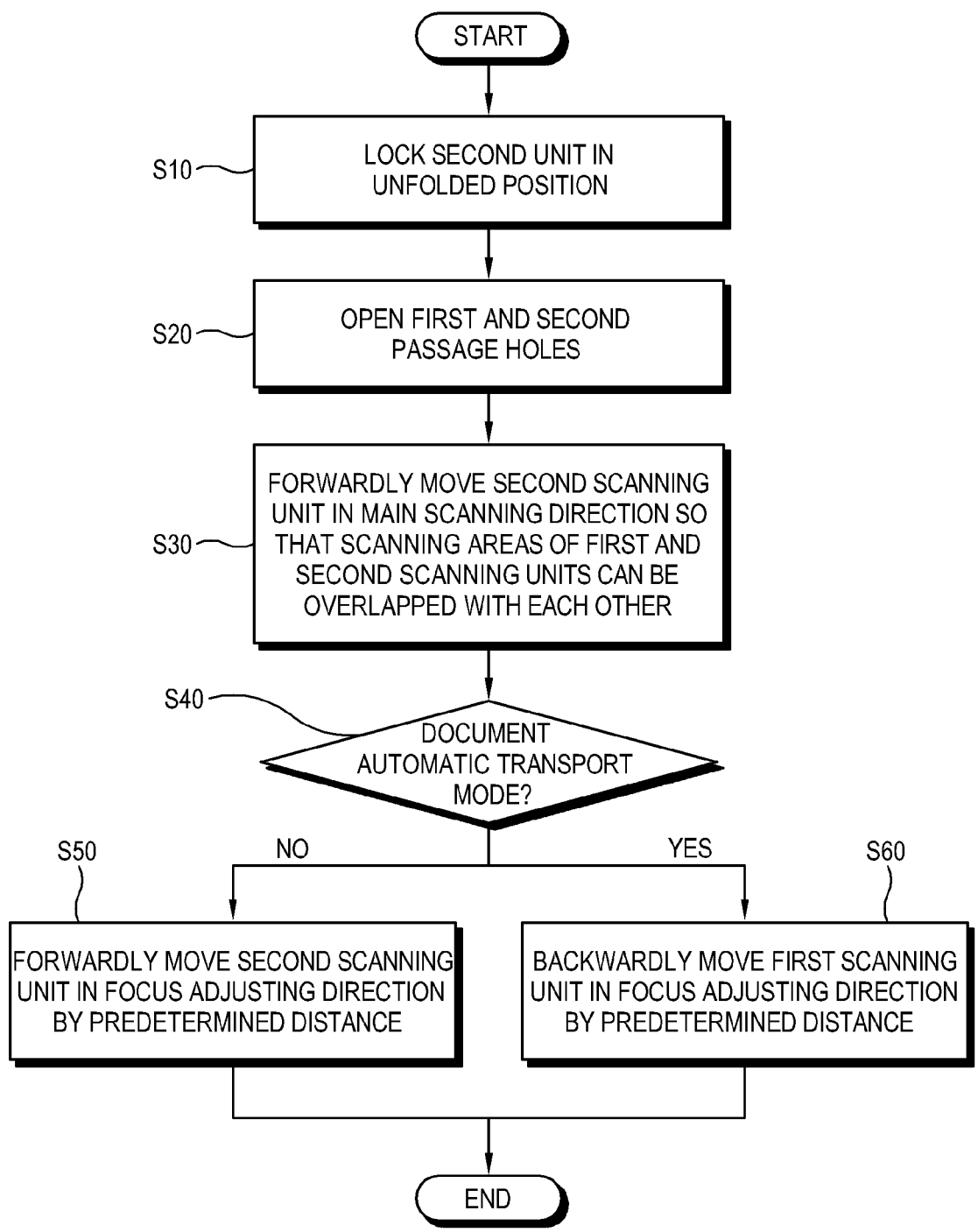
FIG. 7 is a flowchart illustrating a converting process of the scanner in FIG. 1 from the folded state to the unfolded state.

FIG. 7 is a flowchart illustrating a converting process of the scanner in FIG. 1 from the folded state to the unfolded state. Therefore, FIG. 7 illustrates a process in which the scanner 100 is converted from the double side scanning mode to the single side scanning mode. If the second unit 120 is positioned in the folded position, the first and second scanning units 111 and 121 are disposed so that double side scanning is available. That is, the first and second scanning units 111 and 121 are positioned to correspond to the double side scanning mode of the above table.

At first, the second unit 120 is locked to be positioned in the unfolded position (S10). Then, the first and second passage holes 123*a* shown in FIG. 4 formed through the first and second unit bodies 113 and 123 of the first and second units 110 and 120 are opened (S20). The second scanning unit 121 is forwardly moved in the main scanning direction Y through the opened first and second passage holes 123*a* shown in FIG. 4 so that the scanning areas of the first scanning unit 111 and the second scanning unit 121 overlap each other by a predetermined overlapping distance ΔS (S30). While described in terms of moving the second scanning unit 121, it is understood that the first scanning unit 111 can be moved by the distance ΔS in addition to or instead of the second scanning unit 121.

Then, it is determined whether to perform the document automatic transport mode, or the scanner moving mode in the single side scanning mode (S40). This may be determined automatically, or determined based on user input. For the automatic mode determination, a sensor (not show) sensing whether the document inputted through the first and second document passage openings 115 and 125 exists or not, and an inertia sensor sensing movement of the scanner 100 may be provided.

In case of the document automatic transport mode, the first scanning unit 111 is backwardly moved in the focus adjusting direction Z by a predetermined distance ΔM (S60). That is, the first scanning unit 111 is moved from the first focus position $Z_1$ to the second focus position $Z_2$.

TABLE 1

|  | double side scanning mode | | document automatic transport single side scanning mode | | scanner moving single side scanning mode | |
| --- | --- | --- | --- | --- | --- | --- |
|  | first scanning unit 111 | second scanning unit 121 | first scanning unit 111 | second scanning unit 121 | first scanning unit 111 | second scanning unit 121 |
| focus adjusting direction Z | $Z_1$ | $Z_2$ | $Z_2$ | $Z_2$ | $Z_1$ | $Z_1$ |
| main scanning direction Y | $Y_3$ | $Y_1$ | $Y_3$ | $Y_2$ | $Y_3$ | $Y_2$ |

On the other hand, in case of no document automatic transport mode (that is, in case of the scanner moving mode), the second scanning unit 121 is forwardly moved in the focus adjusting direction Z by a predetermined distance ΔM (S50). Here, the operations S40 to S60 may be performed before the operations S10 to S30.

Accordingly, the positions of the first and second scanning units 111 and 121 are adjusted to be capable of scanning depending on the single side scanning mode from the double side scanning mode, thereby enabling the single side scanning.

Hereinafter, a moving process of the second unit 120 from the unfolded position to the folded position, that is, a converting process from the single side scanning mode to the double side scanning mode will be described by referring to FIG. 8.

Figure 8:
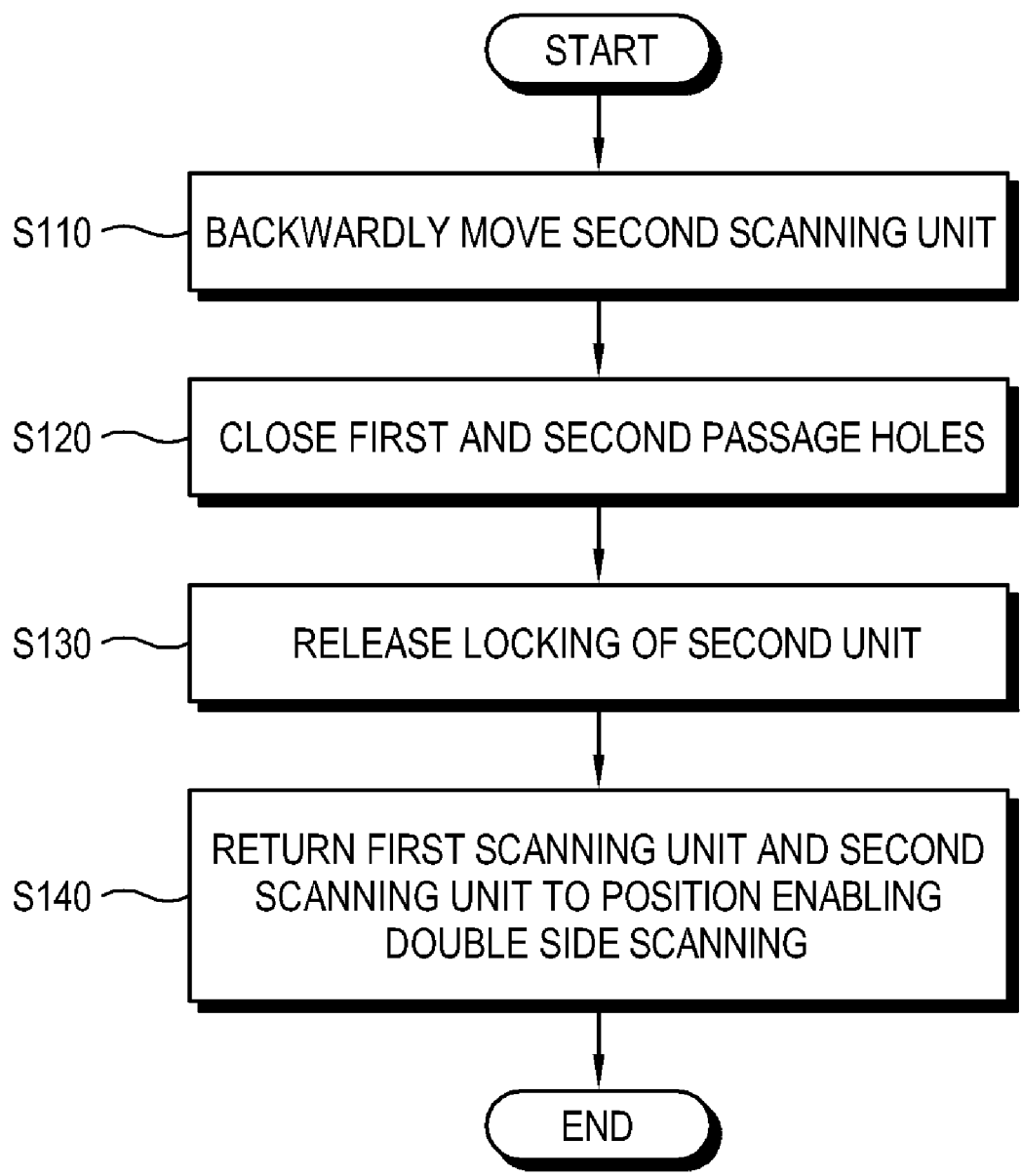
FIG. 8 is a flowchart illustrating a converting process of the scanner in FIG. 1 from the unfolded state to the folded state.

FIG. 8 is a flowchart illustrating a converting process of the scanner in FIG. 1 from the unfolded state to the folded state. At first, the second scanning unit 121 is backwardly moved through the opened first and second passage holes 123a in FIG. 4 (S110). That is, the second scanning unit 121 is moved from the second scanning position $Y_2$ to the first scanning position $Y_1$. Accordingly, the second scanning unit 121 is accommodated again inside the second unit body 123 so that the second unit 120 can rotate about the hinge 140.

Then, the opened first and second passage holes 123a shown in FIG. 4 are closed (S120). Accordingly, a foreign substance can be prevented from entering the first and second unit bodies 113 and 123 from the outside.

The second unit 120 which is locked in the unfolded position is released (S130).

Then, the first and second scanning units 111 and 121 are returned to an original position in the focus adjusting direction Z to perform the double side scanning (S140). The position returning operation S140 includes an operation of forwardly moving the first scanning unit 111 which is backwardly moved by a predetermined distance ΔM in the focus adjusting direction Z by the predetermined distance ΔM in case of the document automatic transport mode, and an operation of backwardly moving the second scanning unit 121 which is forwardly moved by a predetermined distance ΔM in the focus adjusting direction Z by the predetermined distance ΔM in case of the scanner moving mode.

The control method of the scanner 100 may further include an operation of scanning both sides of the document if the second unit 120 is positioned in the folded position.

Also, for the double side scanning of the document, the control method of the scanner 100 further includes an operation for transporting the document through the second document passage opening 125 positioned to have the same depth of focus Δd from the first scanning unit 111 and the second scanning unit 121 before the scanning operation. As necessary, the control method of the scanner 100 may further include an operation of informing a user of an error if the document is not inputted through the second document passage opening 125 which enables the double side scanning.

As described above, each scanning unit 111 and 121 is integrally moved. Alternatively, the depth of focus to the document to be scanned may be appropriately corrected by moving the lens 111d and 121d of each scanning unit 111 and 121.

The scanner according to aspects of the present invention may include an independent scanner, or a scanner applied to a multi function apparatus having a copying function, a scanning function, a facsimile function, etc.

As describe above, a scanner and a control method thereof according to an aspect of the present invention may have some of the following uses. Both sides of a document can be concurrently scanned in a folded position, and a single side of a bigger document can be scanned in an unfolded position. A scanner moving mode in which the scanner is put and moved on a document to scan the document can be supported. A, at least one of a plurality of scanning units is moved in a focus adjusting direction to maintain uniform quality of the scanned document. A document can be scanned without leaving a blank area in an unfolded position.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A scanner which is capable of being folded and unfolded, the scanner comprising:
   a first unit which comprises a first scanning unit which scans a document;
   a second unit rotatably connected to the first unit, and which comprises a second scanning unit which moves between a folded position in which the second scanning unit faces the first scanning unit, and an unfolded position in which the second scanning unit is unfolded from the folded position; and
   a moving unit which moves at least one of the first scanning unit and the second scanning unit in at least one of a focus adjusting direction and a transverse direction to a transport direction of the document.

2. The scanner according to claim 1, wherein the first or second scanning unit is provided to move in the focus adjusting direction, and
   the scanner further comprises a control unit which controls the moving unit so that a depth of focus from the first scanning unit to the document is within a same predetermined range as a depth of focus from the second scanning unit to the document.

3. The scanner according to claim 1, wherein at least one of the first and second scanning units is provided to move in the transverse direction, and
   the scanner further comprises a control unit which controls the moving unit so that scanning areas of the first and second scanning units overlap with each other in the transverse direction in the unfolded position.

4. The scanner according to claim 1, wherein the first and second units are respectively formed with first and second document passage openings, and
   the first and second document passage openings are connected with each other in the unfolded position so that the document passes through the first and second scanning units.

5. The scanner according to claim 4, wherein the first and second scanning units are disposed to be focused on the document inside the first document passage opening in the folded position.

6. The scanner according to claim 4, further comprising a control unit which controls the moving unit so that the first and second scanning units are moved in the focus adjusting direction to correspond to a document automatic transport mode and a scanner moving mode, in which a single side of the document is to be scanned.

7. The scanner according to claim 1, wherein the first unit further comprises a first unit body which is formed with a first passage hole through which the second scanning unit moves in the unfolded position, and
   the second unit further comprises a second unit body which is formed with a second passage hole which is connected to the first passage hole to guide the second scanning unit moving in the transverse direction.

8. The scanner according to claim 7, further comprising a cover which opens and closes the first passage hole and the second passage hole.

9. A method of controlling a scanner including a first unit which comprises a first scanning unit which scans a document, and a second unit which comprises a second scanning unit which moves between a folded position in which the second scanning unit faces the first scanning unit, and an unfolded position in which the second scanning unit is unfolded from the folded position, the method comprising:
scanning both sides of the document if the second unit is positioned in the folded position; and
moving at least one of the first scanning unit and the second scanning unit, in at least one of a focus adjusting direction and a transverse direction to a transport direction of the document, if the second scan unit is moved between the folded and unfolded positions.

10. The method according to claim 9, further comprising transporting the document through a document passage opening which has a same depth of focus from the first and second scanning units before scanning both sides of the document.

11. The method according to claim 9, wherein the moving at least one of the first scanning unit and the second scanning unit comprises moving the at least one of the first and second scanning units in the focus adjusting direction so that a depth of focus from the first scanning unit to the document, and a depth of focus from the second scanning unit to the document are within a predetermined range.

12. The method according to claim 9, further comprising locking the position of the second unit so that the second unit is positioned in the unfolded position before being moved in the transverse direction.

13. The method according to claim 12, wherein the first and second units respectively comprise first and second passage holes which allow at least one of the first scanning unit and the second scanning unit to move in the transverse direction in the unfolded position, and
opening the first and second passage holes.

14. The method according to claim 13, wherein the moving at least one of the first scanning unit and the second scanning unit comprises forwardly moving at least one of the first and second scanning units in the transverse direction so that scanning areas of the first and second scanning units overlap with each other in the transverse direction after the locking and the opening are performed.

15. The method according to claim 14, further comprising:
backwardly moving in the transverse direction at least one of the first and second scanning units which is forwardly moved when the second unit is locked and the first and second passage holes are opened, and
closing the first and second passage holes after backwardly moving the at least one of the first and second scanning units.

16. The method according to claim 15, further comprising releasing the locking of the second unit after backwardly moving the at least one of the first and second scanning units.

17. A method of controlling a scanner including a first unit which comprises a first scanner which scans a document, and a second unit which comprises a second scanner which moves between a folded position in which the second scanner faces the first scanner, and an unfolded position in which the second scanner is unfolded from the folded position, the method comprising:
sensing a relative position of the first unit relative to the second unit; and
moving at least one of the first and second scanners, in at least one of a focus adjusting direction and a transverse direction to a transport direction of the document, according to the sensed relative position of the first and second units.

18. An apparatus for scanning a document comprising;
a first unit including a first scanner;
a second unit rotatably connected to the first unit and including a second scanner;
a controller which adjusts a relative position of the first scanner and the second scanner according to a sensed relative position of the first unit relative to the second unit.

* * * * *